US008849309B2

(12) United States Patent
Parata et al.

(10) Patent No.: US 8,849,309 B2
(45) Date of Patent: Sep. 30, 2014

(54) METHOD AND SYSTEM FOR FORECASTING TRAVEL TIMES ON ROADS

(75) Inventors: Dario Parata, Turin (IT); Massimo Colonna, Turin (IT); Piero Lovisolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 961 days.

(21) Appl. No.: 12/809,795

(22) PCT Filed: Dec. 20, 2007

(86) PCT No.: PCT/EP2007/064335
§ 371 (c)(1), (2), (4) Date: Jun. 21, 2010

(87) PCT Pub. No.: WO2009/080104
PCT Pub. Date: Jul. 2, 2009

(65) Prior Publication Data
US 2010/0273508 A1 Oct. 28, 2010

(51) Int. Cl.
*H04W 24/00* (2009.01)
*G08G 1/01* (2006.01)

(52) U.S. Cl.
CPC .................................... *G08G 1/0104* (2013.01)
USPC ....................................................... 455/456.3

(58) Field of Classification Search
USPC ................. 701/117–120, 400, 408–417, 423; 455/456.1–457, 414.1, 569.2
See application file for complete search history.

(56) References Cited

U.S. PATENT DOCUMENTS

| | | | | |
|---|---|---|---|---|
| 5,465,289 | A | 11/1995 | Kennedy, Jr. | |
| 6,490,519 | B1 * | 12/2002 | Lapidot et al. | 701/117 |
| 6,577,946 | B2 | 6/2003 | Myr | |
| 6,650,948 | B1 * | 11/2003 | Atkinson et al. | 701/117 |
| 2003/0014181 | A1 | 1/2003 | Myr | |

FOREIGN PATENT DOCUMENTS

| | | | |
|---|---|---|---|
| EP | 0763807 | A1 | 3/1997 |
| EP | 1501321 | A1 | 1/2005 |
| WO | 02/089089 | A1 | 11/2002 |
| WO | 2007/077472 | A1 | 7/2007 |

OTHER PUBLICATIONS

International Search Report and Written Opinion dtd Jun. 30, 2008, PCT/EP2007/064335.

* cited by examiner

*Primary Examiner* — Brandon Miller
(74) *Attorney, Agent, or Firm* — Banner & Witcoff, Ltd.

(57) ABSTRACT

A method of providing forecast of road transit times on roads of a monitored roads network, can include receiving a forecasted road transit time indication calculated by a road traffic monitoring system in respect of at least one road of the monitored roads network; and correcting the received forecasted road transit time indication based on information obtained from a cellular mobile communications network. The information includes information related to mobile terminals connected to the cellular mobile communications network and engaged in calls, and located in the neighborhood of the at least one road.

24 Claims, 5 Drawing Sheets

| Type of road | Number of lanes *per* march sense | Environment | $N_{ct}$ | $N_{lt}$ |
|---|---|---|---|---|
| Highway | 2 | Urban | Aa1 | Ab1 |
| Highway | 3 | Extraurban | Aa2 | Ab2 |
| ………. | ………. | ………. | ………. | ………. |
| Interstate | 2 | Extraurban | Sa1 | Sb1 |
| Interstate | 1 | Extraurban | Sa2 | Sb2 |
| ………. | ………. | ………. | ………. | ………. |
| Street | 1 | Urban | Ua1 | Ub1 |
| Street | 2 | Urban | Ua2 | Ub2 |
| ………. | ………. | ………. | ………. | ………. |
| ………. | ………. | ………. | ………. | ………. |

FIG. 3

METHOD AND SYSTEM FOR FORECASTING TRAVEL TIMES ON ROADS

CROSS REFERENCE TO RELATED APPLICATIONS

This is a U.S. National Phase Application under 35 U.S.C. §371 of International Application No. PCT/EP2007/064335 filed Dec. 20, 2007, which was published Under PCT Article 21(2), the entire contents of which are incorporated herein by reference.

BACKGROUND OF THE INVENTION

1. Field of the Invention

The present invention generally relates to methods and systems for estimating, monitoring and managing road traffic. More specifically, the present invention proposes a method and a system for precisely forecasting transit times or average transit speeds on roads of a monitored roads network.

2. Description of the Related Art

The estimation, monitoring and management of road traffic are nowadays normally accomplished based on information provided by sensors and video cameras deployed along the roads of the roads network to be monitored, and/or by police officers on the field, and/or by indications provided by phone directly by the vehicles' drivers driving on the roads network.

Methods and systems are also known exploiting information provided by vehicles (called "floating cars") equipped with GPS receivers, which are capable of determining and communicating the geographic location of the vehicles.

In recent years, cellular mobile telephony networks (cellular PLMNs—Public Land Mobile Networks) have also been used for the purposes of estimation, monitoring and management of the road traffic, thanks to the widespread presence of mobile phones among the population. An advantage of these methods is that they do not require the deployment of additional infrastructures (like sensors, video cameras, GPS receivers) and allow capillary estimation of the roads' traffic conditions.

For example, in U.S. Pat. No. 6,577,946 location information obtained and continuously updated from vehicular-based cellular phones is collected, processed and used as a basis for input to intelligent transportation systems, in particular to real time urban traffic guidance for vehicular congestion and intelligent traffic control systems. Location information is obtainable from wireless location systems such as GSM in Europe, CDMA in the USA, or PDC in Japan, and depends on supporting technologies, which are in the process of perpetual improvement. Relying on cellular networks location system capabilities to provide moderately reliable position information, the records of vehicle phones coordinates, timing, etc., are collected, updated and stored in the traffic service center database. Those records together with digital maps are fed into mathematical models and algorithms that construct lists of vehicles traveling on various road sections, traffic loads at particular road sections, real time travel times along all road sections resulting from traffic congestion in particular areas, turning loads for signal intersections, and other key parameters necessary for real time functioning of intelligent transportation systems, in particular of intelligent traffic control systems, route guidance systems, etc.

In U.S. Pat. No. 6,650,948 a method is described for monitoring vehicular traffic flow in a road network in an area served by a mobile telecommunications device network having a call management system provided with a mobile telecommunications device positioning system providing positional data for active mobile telecommunications devices. The method comprises capturing geographical positioning data for individual active devices carried aboard vehicles and converting these into probability vectors representing the likelihood of the vehicle having arrived at any of the possible road components of the road network compatible with the geographical positional data. As the vehicle travels along, this process is repeated and new probability vectors constructed based on the probability of any of the available routes between the new probability vector road component position and the immediately preceding probability vector road component position. The expected transit times for the available routes are computed and compared with actual transit times to provide delay factors for the available routes and thereby the road components thereof. Average delay factors are obtained by making use of data obtained for other vehicles thereby to provide a report indicative of the degree of traffic congestion and delay on the roads.

WO 07/077,472 discloses a road traffic monitoring system comprising: a first input for receiving position estimations of mobile terminals; a second input for receiving input specifications chosen depending on the type of service for which such monitoring is performed; and an output for generating road traffic maps, each road traffic map being associated with a set of territory elements and including, for each one of the territory elements, at least one mobility index of mobile terminals travelling within such territory element. Preferably, input specifications are chosen among at least two of the following parameters: territory element, territory element observation time slot, maximum allowable error on the estimation of said at least one mobility index.

In EP 763807 an estimation of traffic conditions on roads located in the radio coverage areas of a wireless communications network based on an analysis of real-time and past wireless traffic data carried on the wireless communications network. Data analyzed may include, for example, actual (current) and expected (past average) number of a) active-busy wireless end-user devices in one or more cells at a particular period of time, b) active-idle wireless end-user devices registered in a location area of the wireless communications network, c) amount of time spent by mobile end-user devices in one or more cells at a particular period of time.

U.S. Pat. No. 5,465,289 discloses a method and apparatus for providing vehicular traffic information using presently existing cellular telephone system technology. Traffic sensors monitor the control and voice channel transmissions of cellular units within a cellular telephone system. Data from these transmissions is extracted and analyzed according to a statistical model and derived vehicle geolocating information to generate vehicular traffic information that is transmitted to a central control center. By combining the information from all of the traffic sensors and each individual cell within a cellular telephone system, a picture of the traffic conditions existing along major thoroughfares may be determined.

SUMMARY OF THE INVENTION

The Applicant has observed that the known road traffic estimation methods that exploit information provided by wireless, mobile communications networks are in general not accurate, because they estimate the roads' transit times based on the successive localizations of the mobile terminals. Such localizations, performed using measurements made by the cellular network apparatuses, are scarcely precise, being affected by errors of the order of 150-200 m in urban areas, and even greater in extraurban areas. Additionally, it is statistically demonstrated that vehicles drivers, while engaged in phone calls, more or less modify their driving conduct, which thus becomes anomalous compared to the average traffic conditions (for example, they slow down their vehicle's speed, or momentarily stop at the road side).

The scarce precision of the localization and the anomalous driving conduct of the drivers engaged in phone calls negatively affect the precision of the road traffic estimation.

The Applicant has tackled the problem of improving the precision of the roads traffic estimations made exploiting the information provided by cellular mobile communications networks.

Essentially, the Applicant has found that a solution to the above problem can call for correcting the forecasted roads' transit times, or, equivalently, the forecasted average roads' transit speeds, exploiting information related to mobile terminals connected to the cellular mobile communications network and engaged in calls, and located in the neighborhood of the at least one road, particularly data like the number of calls made by the mobile terminals, and/or the number of successive localizations of (i.e., the successive positions taken by) the mobile terminals engaged in calls per road arc.

For the purposes of the present invention, the term "road arc" is meant to denote a road section delimited by a start point and an end point. The road arc is characterized by a transit sense; in roads having two transit senses, a same road section may include two distinct road arcs, having opposite transit sense.

It can be demonstrated that the number of calls made by the mobile terminals, or the number of successive localizations of the mobile terminals engaged in calls, are correlated to the road traffic. For example, the above cited document EP 763807 describes how to set thresholds on the number of calls made by mobile terminals in a certain network cell for assessing whether or not there is a traffic jam on a certain road.

Statistical studies made by the Applicant have shown that it is possible to identify laws that allow correcting the forecasted transit times (and/or the forecasted average transit speeds) on road arcs based on the number of calls made by the mobile terminals, and/or on the number of successive localizations of the mobile terminals engaged in a call in the neighborhood of a road arc of interest. For the purposes of the present invention, the expression "in the neighborhood of a road arc" means a geographic area that includes the road arc of interest, and that extends from the road arc of interest to a prescribed distance therefrom, that is for example related to the precision of the mobile terminals' localization method adopted.

In particular, the above-mentioned forecasted transit time correction laws may depend:

- on the nature of the road (highway, motorway, interstate road, local road, city street, number of lanes of the road, and the like); in addition or in alternative to this data, historical data related to the average number of users on the road section of interest may be exploited;
- on the estimation of the road arc transit times provided by other road traffic estimation systems, based for example on information derived from one or more cellular PLMNs, and/or conventional information sources like sensors deployed along the roads, and GPS receivers installed on-board of the vehicles;
- on the number of calls made by the mobile terminals and/or the number of successive localizations (positions) of the mobile terminals engaged in calls, considering those mobile terminals that are located in the neighborhood of the road arc of interest and that are moving in a sense congruent with the sense of the road arc of interest.

According to an aspect of the present invention, a method of providing forecast of road transit times on roads of a monitored roads network is provided, the method comprising:

- receiving a forecasted road transit time indication calculated by a road traffic monitoring system in respect of at least one road of the monitored roads network;
- correcting the received forecasted road transit time indication based on information obtained from a cellular mobile communications network, wherein said information includes information related to mobile terminals connected to the cellular mobile communications network and engaged in calls, and located in the neighborhood of the at least one road.

Said information may include at least one among:

- an indication of a number of calls made by mobile terminals connected to the cellular mobile communications network and located in the neighborhood of the at least one road; and
- an indication of a number of successive positions taken by the mobile terminals connected to the cellular mobile communications network, located in the neighborhood of the at least one road and engaged in calls.

Said correcting may comprise:

- altering the received forecasted road transit time indication in a first way in case said indication of a number of calls, or said indication of a number of successive positions, exceeds a first predetermined threshold;
- altering the received forecasted road transit time indication in a second way, contrary to the first way, in case said indication of a number of calls, or said indication of a number of successive positions, is below a second predetermined threshold lower than the first predetermined threshold;
- leaving the received forecasted road transit time indication essentially unaltered in case said indication of a number of calls, or said indication of a number of successive positions, falls amidst said first and second predetermined thresholds.

Said forecasted road transit time indication may include a forecasted average road transit speed, and said altering in the first way comprises decreasing the forecasted average road transit speed, whereas said altering in the second way comprises increasing the forecasted average road transit speed.

An amount of said decreasing may be related to a comparison between said indication of a number of calls, or said indication of a number of successive positions, and the first predetermined threshold.

An amount of said increasing may be related to a comparison between said indication of a number of calls, or said indication of a number of successive positions, and the second predetermined threshold. Said increasing may have an upper limit, for example related to a maximum allowed road transit speed on the at least one road.

The method may further comprise:

- assigning to said at least one road a transit sense; and
- in said information related to mobile terminals connected to the cellular mobile communications network and engaged in calls, and located in the neighborhood of the at least one road, considering mobile terminals that are moving congruently to the transit sense assigned to the road.

Said mobile terminals located in the neighborhood of the at least one road may include mobile terminals that are located within a predetermined distance from the road.

Said first and second predetermined thresholds may be calculated based on historical data derived from the cellular mobile communications network.

In particular, said historical data may include historical data related to a number of calls made by mobile terminals connected to the cellular mobile communications network and located in the neighborhood of the considered at least one road, or historical data related to a number of successive positions taken by the mobile terminals connected to the cellular mobile communications network, located in the neighborhood of the considered at least one road and engaged in calls.

Otherwise, said historical data may include historical data related to a number of calls made by mobile terminals connected to the cellular mobile communications network and located in the neighborhood of a road of a same road type as the considered at least one road, or historical data related to a number of successive positions taken by the mobile terminals connected to the cellular mobile communications network, located in the neighborhood of a road of the same type as the considered at least one road and engaged in calls. Said road type is adapted to discriminate among urban streets, extraurban roads, highways, number of lanes of the road, environment of the road.

According to another aspect of the present invention, a system adapted to provide forecast of road transit times on roads of a monitored roads network is provided, the system being in use adapted to:

- receiving a forecasted road transit time indication calculated by a road traffic monitoring system in respect of at least one road of the monitored roads network;
- correcting the received forecasted road transit time indication based on information obtained from a cellular mobile communications network, wherein said information includes information related to mobile terminals connected to the cellular mobile communications network and engaged in calls, and located in the neighborhood of the at least one road.

Said information may include at least one among:

- an indication of a number of calls made by mobile terminals connected to the cellular mobile communications network and located in the neighborhood of the at least one road; and
- an indication of a number of successive positions taken by the mobile terminals connected to the cellular mobile communications network, located in the neighborhood of the at least one road and engaged in calls.

The correction operated by the system may involve:

- altering the received forecasted road transit time indication in a first way in case said indication of a number of calls, or said indication of a number of successive positions, exceeds a first predetermined threshold;
- altering the received forecasted road transit time indication in a second way, contrary to the first way, in case said indication of a number of calls, or said indication of a number of successive positions, is below a second predetermined threshold lower than the first predetermined threshold;
- leaving the received forecasted road transit time indication essentially unaltered in case said indication of a number of calls, or said indication of a number of successive positions, falls amidst said first and second predetermined thresholds.

Said forecasted road transit time indication may include a forecasted average road transit speed, and said altering in the first way comprises decreasing the forecasted average road transit speed, whereas said altering in the second way comprises increasing the forecasted average road transit speed.

An amount of said decreasing may be related to a comparison between said indication of a number of calls, or said indication of a number of successive positions, and the first predetermined threshold.

An amount of said increasing may be related to a comparison between said indication of a number of calls, or said indication of a number of successive positions, and the second predetermined threshold.

Said increasing may have an upper limit, for example related to a maximum allowed road transit speed on the at least one road.

The system may further be adapted to:

- assigning to said at least one road a transit sense; and
- in said information related to mobile terminals connected to the cellular mobile communications network and engaged in calls, and located in the neighborhood of the at least one road, considering mobile terminals that are moving congruently to the transit sense assigned to the road.

The mobile terminals located in the neighborhood of the at least one road may include mobile terminals that are located within a predetermined distance from the road.

Said first and second predetermined thresholds may be calculated based on historical data derived from the cellular mobile communications network, and said historical data include:

- either historical data related to a number of calls made by mobile terminals connected to the cellular mobile communications network and located in the neighborhood of the considered at least one road, or historical data related to a number of successive positions taken by the mobile terminals connected to the cellular mobile communications network, located in the neighborhood of the considered at least one road and engaged in calls,
- or historical data related to a number of calls made by mobile terminals connected to the cellular mobile communications network and located in the neighborhood of a road of a same road type as the considered at least one road, or historical data related to a number of successive positions taken by the mobile terminals connected to the cellular mobile communications network, located in the neighborhood of a road of the same type as the considered at least one road and engaged in calls, wherein said road type is adapted to discriminate among urban streets, extraurban roads, highways, number of lanes of the road, environment of the road.

BRIEF DESCRIPTION OF THE DRAWINGS

These and other features and advantages of the present invention will be made clear by the following detailed description of an embodiment thereof, provided merely by way of non-limitative example, conducted making reference to the attached drawings, wherein:

FIG. 3 schematically shows a table with threshold values for typical roads;

DETAILED DESCRIPTION OF PREFERRED EMBODIMENTS OF THE INVENTION

Figure 1:
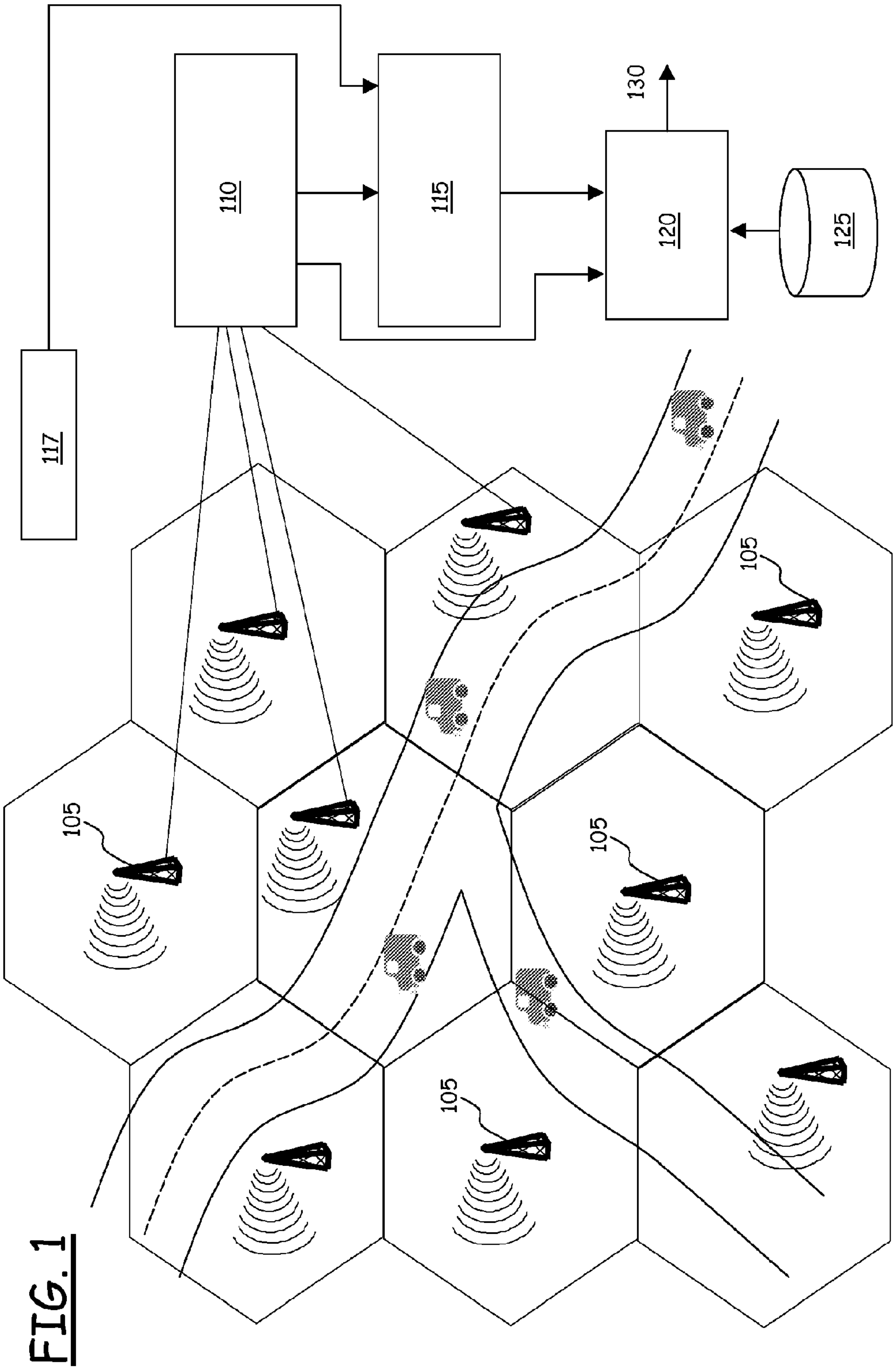
FIG. 1 synthetically shows a system according to an embodiment of the present invention, and a possible use scenario.

Making reference to the drawings, in FIG. 1 a system according to an embodiment of the present invention is synthetically shown, together with a possible use scenario.

In particular, FIG. 1 schematically shows a part of a monitored roads network and a portion of a cellular PLMN that covers the geographic area where the considered roads network part is located. Hereinafter, merely by way of example, it will be assumed that the cellular PLMN is a GSM (Global System for Mobile communications) network, however it should be understood that the specific type of cellular PLMN is not limitative to the present invention, which also applies to other types of cellular PLMNs, like for example other second-generation network, or the UMTS (Universal Mobile Telecommunications System) network or other third-generation networks, and, more generally, to any cellular mobile communications network.

In the drawing, reference numeral 105 denotes Base Transceiver Stations (BTSs) of the cellular PLMN; each BTS 105 covers (being the "best server" therein) a geographic area, called a "cell", which in the drawing is for simplicity depicted as hexagonal in shape. Hereinafter, for not complicating the drawing, the generic PLMN cell will be identified by the same reference numeral as the corresponding BTS. It should be understood that, in practical cases, the PLMN cells generally do not have an hexagonal shape, and different cells have different area coverage (the shape and width of a generic cell depending on aspects like for example the BTS's transmission power and the morphology of the territory; for example, PLMN cells in urban area are typically smaller than PLMN cells in extraurban area).

The BTSs 105 handles the physical communication with the mobile terminals in the respective cells. The BTSs 105 are connected to respective Base Station Controllers (BSCs) that manage the associated BTSs 105, routing the calls and managing the mobile terminals' mobility between different cells (i.e., the handovers). The BSCs are connected to respective Mobile Switching Centers (MSCs), managing the associated BSCs and the set-up of the calls and their routing through the network. In the drawing, all the core network apparatuses like the BSCs and the MSCs are globally represented by a block 110.

Block 115 in the drawing denotes a system for the monitoring, estimation and managing of road traffic. The road traffic monitoring, estimation and managing system 115 derives information from the cellular PLMN 110; the road traffic monitoring, estimation and managing system 115 may also derive information from other information sources, globally denoted as 117 in the drawing, like for example systems of sensors deployed on the roads, and systems based on information received by GPS receivers on-board of the circulating vehicles. The specific nature of the road traffic monitoring, estimation and managing system 115 is not limitative for the present invention; it may be any of the systems known in the art. The road traffic monitoring, estimation and managing system 115 is in particular adapted to calculate, in real time, forecasts of the road transit times, like for example the system disclosed in U.S. Pat. No. 6,650,948; the real-time road traffic monitoring, estimation and managing system 115 is also able to provide road transit times forecast that are updated on a regular time basis for every road arc, and the system may also provide additional information like the average roads' transit speed.

Block 120 in the drawing represents a road transit time forecast corrector according to an embodiment of the present invention. The forecast corrector 120 receives from the road traffic monitoring, estimation and managing system 115 forecasted roads' transit times, and/or forecasted average roads' transit speeds, and, exploiting further information derived from the cellular PLMN 110, is adapted to refine the roads' transit time (and/or average roads' transit speed) forecasts, as will be described in detail in the following. In particular, in an embodiment of the present invention, in order to refine the roads' transit time forecast, the forecast corrector 120 obtains from the cellular PLMN information related to mobile terminals connected to the cellular mobile communications network and engaged in calls, and located in the neighborhood of the at least one road, particularly information about the number of calls made by mobile terminals, and/or about the number of successive localizations of the mobile terminals engaged in calls, considering those mobile terminals that are located in the neighborhood of the road arcs of interest and that move in a sense congruent to the sense of the road arcs.

In an embodiment of the present invention, the forecast corrector 120 exploits a roads description, which in FIG. 1 is assumed to be stored in a database 125. Alternatively, or in addition, the forecast corrector 120 may exploit historical data about the number of calls made by mobile terminals located in the neighborhood of the road arcs of interest.

The forecast corrector provides at an output 130 corrected, refined, more precise roads transit times forecast, and/or corrected, refined, more precise forecasts of the average transit speed on the road arcs of interest.

Figure 2:
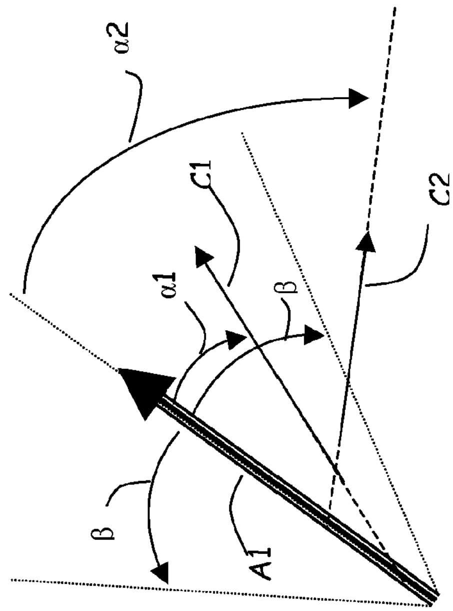
FIG. 2 shows a geometric criterion for congruency of a movement direction and sense of a mobile terminal with a direction and sense of a generic road arc.

For the purposes of the present invention, a mobile terminal is considered to be moving in a sense congruent with the sense of a certain road arc when the mobile terminal moves in a direction and sense such as to form, with the direction and sense of the considered road arc, an angle $\alpha$ that is less than (or, possibly, at most equal to) a predetermined angular value $\beta$. For example, referring to FIG. 2, reference numeral A1 denotes a generic road arc, and C1 and C2 denote the directions and senses of movement of two generic mobile terminals. The mobile terminal moving along the direction and sense C1 is considered to have a movement congruent with the direction and sense of the considered road arc A1, because the angle $\alpha$1 between the directions C1 and A1 is less than the predetermined angle $\beta$, whereas the mobile terminal moving along the direction and sense C2 is considered to have a movement that is not congruent with the direction and sense of the road arc A2, because the angle $\alpha$2 between the directions C2 and A1 is higher than the predetermined angle $\beta$. The choice of the value $\beta$ depends for example on the precision by which it is possible to determine the trajectory of the mobile terminals, and thus it may depend on the localization technique exploited. For example, adopting known localization techniques for the GSM networks (for example, E-OTD, CGI+TA, E-CGI+TA or other); the Applicant found that a good choice may be $\beta=45°$.

The forecast corrector 120 exploits a description of every road arc for which the forecasted transit time (or the forecasted average transit speed) has to be corrected.

One possible road arc description calls for collecting historical data about the number of calls made by the mobile terminals, and/or the number of successive localizations of the mobile terminals engaged in a call, considering those mobile terminals that are located in the neighborhood of the considered road arcs and that are moving in a direction and sense congruent with the directions and senses of the considered road arcs. As defined in the foregoing, the expression "in the neighborhood of a road arc" means a geographic area that includes the road arc of interest, and that extends from the road arc of interest to a predetermined distance therefrom, that is related to the precision of the mobile terminals' localization method adopted. The way in which the historical data may be collected is for example the one described in WO 2007/077472, in the name of the present Applicant, which describes a method thanks to which the historical data have a granularity corresponding to one pixel (i.e., an elementary area) of the area covered by the cellular PLMN; in such a case, the expression "in the neighborhood of a road arc" may mean the area of the pixel that covers the road arc. The time span of the historical data should be sufficiently long to take into account different possible traffic conditions on the considered type of road. Based on the historical data gathered, a reference average value $N_{ca_i}$ of the number of calls placed by the mobile terminals, and/or a reference average value $N_{la_i}$ of the number of successive localizations of mobile terminals engaged in calls for each considered road arc is calculated; the reference average value may be for example calculated as the ratio of the number of calls $n_{ca_i}$ made by the mobile terminals, and/or the number of successive localizations $n_{la_i}$ of the mobile terminals engaged in calls, measured in a considered observation time interval ΔT (in respect of mobile terminals located in the neighborhood of the considered road arc, and that are moving in a direction and sense congruent with those of the considered road arc) and the product of the observation time interval ΔT by the length $l_{a_i}$ of the considered road arc; in formulas:

$$N_{ca_i} = \frac{n_{ca_i}}{\Delta T * l_{a_i}} \qquad N_{la_i} = \frac{n_{la_i}}{\Delta T * l_{a_i}}$$

Another possible road arc description calls for describing the generic road arc in terms of the type, the nature of road it belongs (e.g., motorway, highway, interstate, local road, street, and the like), the number of lanes of the road, the environment (urban, suburban, extraurban), and exploiting a law that, based on these indications, provides an average value of calls made by mobile terminals for the considered road arc. The specific law may be determined experimentally, for example according to the following steps:

- road arcs are identified which may be representative of the different types of roads for which it is desired to calculate the reference average number of call made by the mobile terminals;
- for each type of road, and for a time period sufficiently long to provide statistically-reliable data, the number of calls made by the mobile terminals, and/or the number of successive localizations of the mobile terminals engaged in a call, considering mobile terminals that are moving in a direction and sense congruent with those of the considered road arc, are gathered. As discussed above, the way in which the historical data are collected is for example the one described in WO 2007/077472; the expression "in the neighborhood of a road arc" may mean the area of the pixel that covers a portion of road arc. The time period during which the data are gathered should be sufficiently long to consider different traffic conditions on the considered type of road;
- once the observation period ends, for each type of road a reference average value $N_{ct}$ of the number of calls placed by the mobile terminals, and/or a reference average value $N_{lt}$ of the number of successive localizations engaged in calls for each considered road arc is calculated; for each type of road, the reference average value may be for example calculated as the ratio of the number of calls $n_{cti}$ made by the mobile terminals, and/or the number of successive localizations $n_{lti}$ of the mobile terminals engaged in calls, measured for each type of road in the considered observation time intervals $\Delta T_i$, and the sum of the product of the observation time intervals $\Delta T_i$ by the lengths $l_{ti}$ of the considered road arc; in formulas:

$$N_{ct} = \frac{\sum_i n_{ct_i}}{\sum_i \Delta T_i * l_{t_i}} \qquad N_{lt} = \frac{\sum_i n_{lt_i}}{\sum_i \Delta T_i * l_{l_i}};$$

- tables are thus created that, for every type of road, provide a reference average value $N_{ct}$ of the number of calls placed by the mobile terminals and/or a reference average value $N_{lt}$ of the number of successive localizations engaged in calls for each considered road arc. An example of such a table is shown in FIG. 3.

In other words, for any given road type, it is possible to determine, through a learning process, a reference average value $N_{ct}$ of the number of calls placed by the mobile terminals and/or a reference average value $N_{lt}$ of the number of successive localizations of mobile terminals engaged in calls for each considered road arc; in the following of the present description, the suffix "t" denoting the type of road will be omitted for the sake of simplicity, and the reference average values will be simply indicated as $N_c$ and $N_l$. These reference average values are used by the forecast corrector 120 as comparison values for the comparison to the measured current number of calls and/or number of successive localizations engaged in calls for each considered road arc in respect of mobile terminals that are moving in a direction and sense congruent with those of the considered road arcs, in order to refine the road arc transit time forecasts (and/or the forecasted average transit speeds) provided by the traffic monitoring system 115.

In particular, the reference average values $N_c$ and $N_l$ are used to calculate a correction factor for the forecasted road arc transit time, or for the estimated average transit speed for a considered road arc. Based on the reference average values $N_c$ and $N_l$, two thresholds are determined for any considered road arc (or for a typical road arc): an upper threshold $S_s$ and a lower threshold $S_i$.

The two thresholds are used to determine the correction factor.

In particular, when the current number of calls made by the mobile terminals, and/or the current number of successive localizations of mobile terminals engaged in calls, in respect of mobile terminals that are located in the neighborhood of the considered road arc and which are moving in a direction and sense congruent with those of the considered road arc, exceeds the upper threshold $S_s$, the forecast corrector 120 introduces a correction factor that reduces the estimated average transit speed for the considered road arc: the correction factor is preferably such that the corrected estimated average transit speed tends to zero as the current number of calls made by the mobile terminals, and/or the current number of successive localizations of mobile terminals engaged in calls tends to infinite.

On the contrary, when the current number of calls made by the mobile terminals, and/or the current number of successive localizations of mobile terminals engaged in calls, in respect of mobile terminals that are located in the neighborhood of the considered road arc and which are moving in a direction and sense congruent with those of the considered road arc, fall below the lower threshold $S_i$, the forecast corrector 120 introduces a correction factor that increases the estimated average transit speed for the considered road arc; the correction factor is preferably such that the corrected estimated average transit speed tends to a maximum allowed speed on the type of road to which the considered road arc belongs as the current number of calls made by the mobile terminals, and/or the current number of successive localizations of mobile terminals engaged in calls tends to zero.

Figure 4:
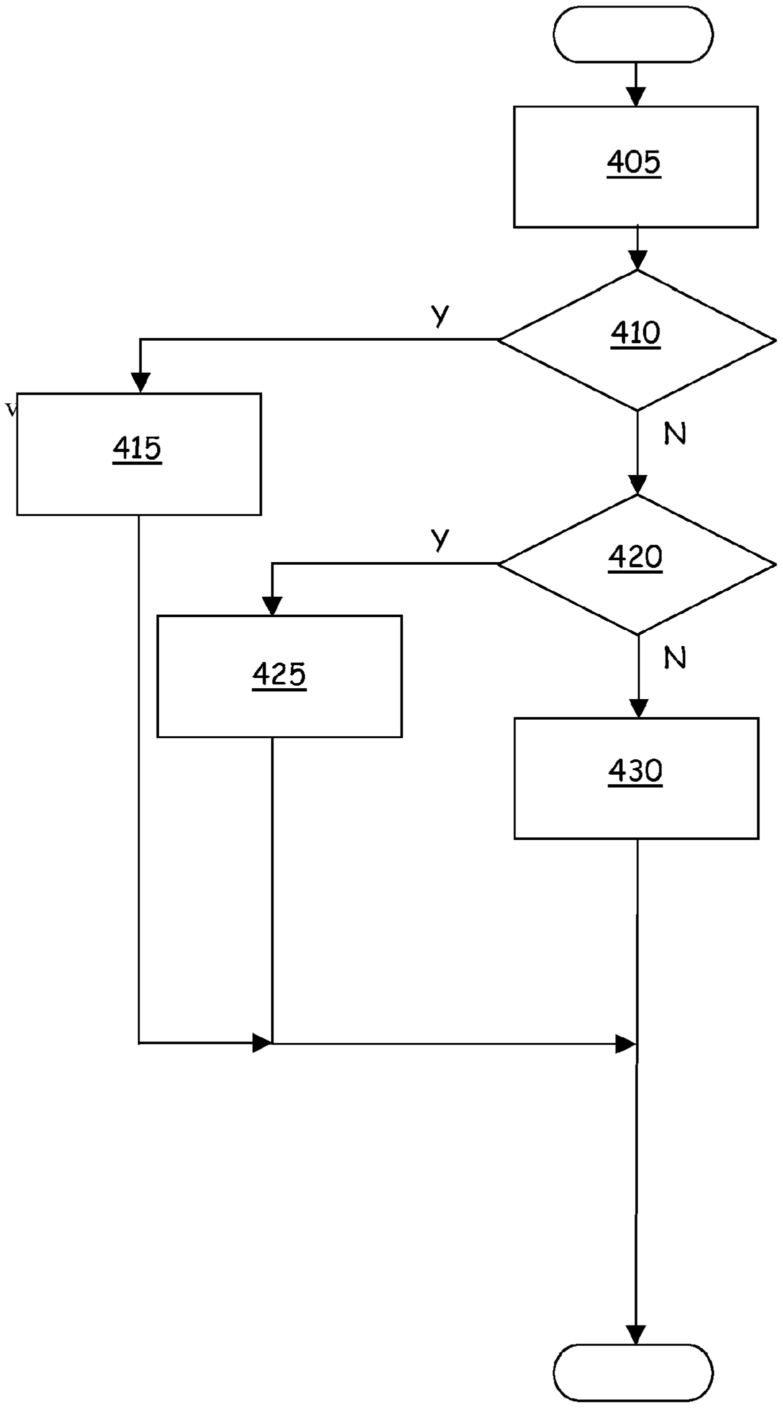
FIG. 4 is a schematic flowchart showing the main steps of a method according to an embodiment of the present invention.

Hereinafter, the main steps of a method according to an embodiment of the present invention will be described in detail, making reference to the schematic flowchart of FIG. 4.

Step 405—Starting from the calculated reference average value $N_l$ of the number of successive localizations of mobile terminals engaged in calls for the considered road arc (the reference average number can be calculated as described in the foregoing, i.e., individually for the considered road arc, or for a typical road arc of the type of road to which the considered road arc belongs), the forecast corrector 120 calculates the upper and lower thresholds $S_s$ and $S_i$. In particular, the upper threshold may be calculated as $S_s=N_l*a$, and the lower threshold may be calculated as $S_i=N_l*b$, where a and b are two constants that may be determined experimentally. In particular, once the law for correcting the estimated average transit speed is chosen, the values of the constant a and b may be determined by performing measures of the average transit speeds on the road arcs, and calculating the values of the constants a and b in such a way as to reduce the error between the corrected estimated average transit speed, provided in output by the forecast corrector 120, and the measured average transit speed. The measurement campaign should be vast enough to cover the different possible traffic conditions on the considered road.

Steps 410-430—Given the number of successive localizations $n_l$ of the mobile terminals engaged in calls, in the neighborhood of the considered road arc moving in a direction and sense congruent with those of the considered road arc, and the estimated average transit speed $V_i$ on the considered road arc, the corrected estimated average transit speed $V_c$ is obtained by applying the following formulas:

$$V_c = \begin{cases} \dfrac{V_i * S_s}{n_l} & n_l > S_s \\ V_i & S_i \le n_l \le S_s \\ \dfrac{(V_i - V_d) * n_l}{S_i} + V_d & n_l < S_i \end{cases}$$

In other words, if the number of successive localizations $n_l$ of the mobile terminals engaged in calls, in the neighborhood of the considered road arc and moving in a direction and sense congruent with those of the considered road arc exceeds the upper threshold $S_s$ (exit branch Y of decision block 410), then the corrected estimated average speed is $$V_c = \frac{V_i * S_s}{n_l}$$

(block 415); if the number of successive localizations $n_l$ of the mobile terminals engaged in calls, in the neighborhood of the considered road arc and moving in a direction and sense congruent with those of the considered road arc is between the upper threshold $S_s$ and the lower threshold $S_i$ (exit branch N of decision block 410, and exit branch Y of decision block 420), then the corrected estimated average transit speed $V_c$ coincides with the estimated average transit speed $V_i$ (block 425); if the number of successive localizations $n_l$ of the mobile terminals engaged in calls, in the neighborhood of the considered road arc and moving in a direction and sense congruent with those of the considered road arc falls below the lower threshold $S_i$ (exit branch N of decision block 420), then the corrected estimated average transit speed $V_c$ is calculated as $$V_c = \frac{(V_i - V_d) * n_l}{S_i} + V_d,$$

where $V_d$ is a default speed equal to the maximum allowed speed on the considered road arc (as admitted by the law). (block 430)

As an alternative, the method may exploit the number of calls made by the mobile terminals, instead of the number of successive localizations of the mobile terminals engaged in calls, or both these quantities, to perform the comparisons directed to determine the type of correction to be made.

Figure 5A:
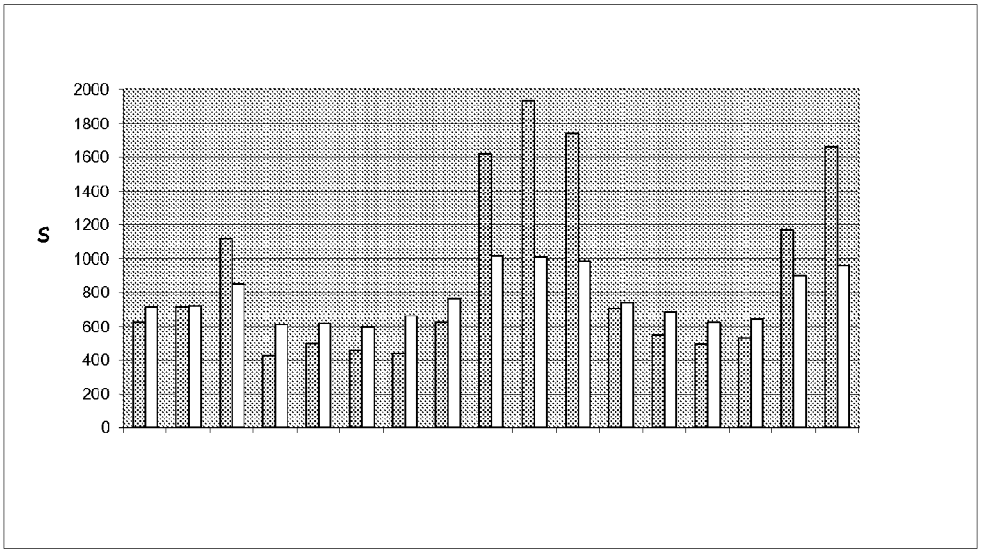
FIGS. 5A and 5B are diagrams showing the comparison between measured road transit speeds, forecasted average road transit speeds calculated by conventional traffic monitoring systems, and corrected forecasted average road transit speeds obtained according to an embodiment of the present invention.
Figure 5B:
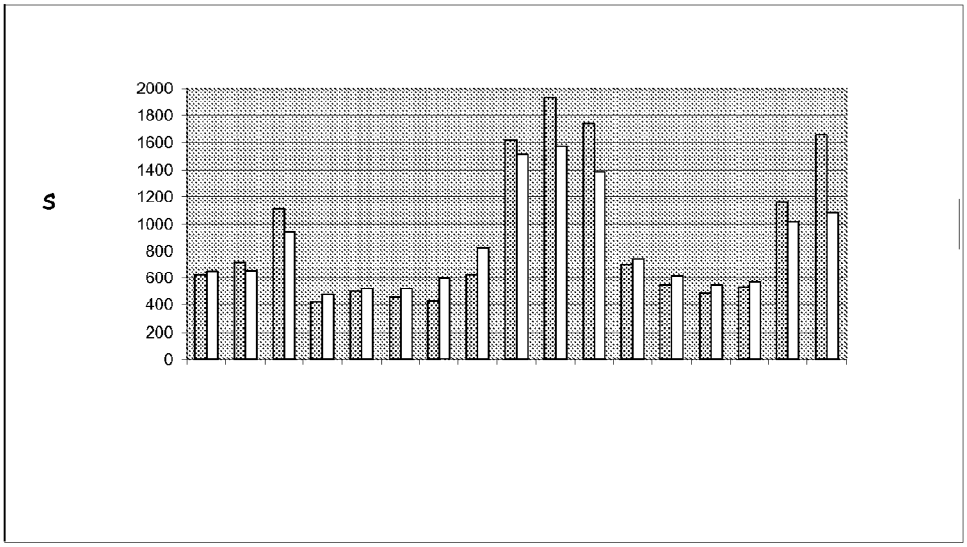

The diagrams in FIGS. 5A and 5B report the comparison between the real road transit times (shaded histograms) and the estimated average transit time (white histograms) before (FIG. 5A) and after (FIG. 5B) the correction operated by the forecast corrector 120. The data reported in the two diagrams relate to a real road path approximately 9 Km long, that was run 17 times by a vehicle running at the average traffic speed, and measuring the transit time by means of a chronometer. For the same road path, estimated average transit speeds are reported, obtained by a conventional system, as in FIG. 5A, and by a system provided with a corrector according to an embodiment of the present invention. The transit times are reported in ordinate and are expressed in seconds; in abscissa there are reported the time instants at which the run started. It can be appreciated that the estimations corrected according to the present invention provide a more close-to-reality approximation of the true transit times.

The present invention can be practiced using suitably programmed computers, as well as by means of hardware or as a mix of hardware and software.

The present invention has been here described presenting some possible embodiments thereof. Those skilled in the art will readily appreciate that several modifications to the described embodiments are possible, as well as other possible embodiments, which do not depart from the scope of the protection as defined in the appended claims.

The invention claimed is:

1. A method comprising:

receiving a forecasted road transit time indication calculated by a road traffic monitoring system based on current data with respect to at least one road of a monitored roads network; and correcting the received forecasted road transit time indication based on information obtained from a cellular mobile communications network, wherein said information includes information related to mobile terminals connected to the cellular mobile communications network and engaged in calls, and located in the neighborhood of the at least one road.

2. The method of claim 1, wherein said information includes at least one among:

an indication of a number of calls made by mobile terminals connected to the cellular mobile communications network and located in the neighborhood of the at least one road; and an indication of a number of successive positions taken by the mobile terminals connected to the cellular mobile communications network, located in the neighborhood of the at least one road and engaged in calls.

3. The method of claim 2, wherein said correcting comprises:

altering the received forecasted road transit time indication in a first way in case said indication of a number of calls, or said indication of a number of successive positions, exceeds a first predetermined threshold;

altering the received forecasted road transit time indication in a second way, contrary to the first way, in case said indication of a number of calls, or said indication of a number of successive positions, is below a second predetermined threshold lower than the first predetermined threshold;

leaving the received forecasted road transit time indication essentially unaltered in case said indication of a number of calls, or said indication of a number of successive positions, falls amidst said first and second predetermined thresholds.

4. The method of claim 3, wherein said forecasted road transit time indication includes a forecasted average road transit speed, and said altering in the first way comprises decreasing the forecasted average road transit speed, whereas said altering in the second way comprises increasing the forecasted average road transit speed.

5. The method of claim 4, wherein an amount of said decreasing is related to a comparison between said indication of a number of calls, or said indication of a number of successive positions, and the first predetermined threshold.

6. The method of claim 4, wherein an amount of said increasing is related to a comparison between said indication of a number of calls, or said indication of a number of successive positions, and the second predetermined threshold.

7. The method of claim 4, wherein said increasing has an upper limit.

8. The method of claim 7, wherein said upper limit is related to a maximum allowed road transit speed on the at least one road.

9. The method of claim 3, wherein said first and second predetermined thresholds are calculated based on historical data derived from the cellular mobile communications network.

10. The method of claim 9, wherein said historical data include historical data related to a number of calls made by mobile terminals connected to the cellular mobile communications network and located in the neighborhood of the considered at least one road, or historical data related to a number of successive positions taken by the mobile terminals connected to the cellular mobile communications network, located in the neighborhood of the considered at least one road and engaged in calls.

11. The method of claim 9, wherein said historical data include historical data related to a number of calls made by mobile terminals connected to the cellular mobile communications network and located in the neighborhood of a road of a same road type as the considered at least one road, or historical data related to a number of successive positions taken by the mobile terminals connected to the cellular mobile communications network, located in the neighborhood of a road of the same type as the considered at least one road and engaged in calls.

12. The method of claim 11, wherein said road type is adapted to discriminate among urban streets, extraurban roads, highways, number of lanes of the road, environment of the road.

13. The method of claim 1, comprising:

assigning to said at least one road a transit sense; and in said information related to mobile terminals connected to the cellular mobile communications network and engaged in calls, and located in the neighborhood of the at least one road, considering mobile terminals that are moving congruently to the transit sense assigned to the road.

14. The method of claim 1, wherein said mobile terminals located in the neighborhood of the at least one road include mobile terminals that are located within a predetermined distance from the road.

15. A system adapted to provide forecast of road transit times on roads of a monitored roads network, the system being in use adapted to:

receiving a forecasted road transit time indication calculated by a road traffic monitoring system based on current data with respect to at least one road of the monitored roads network; and correcting the received forecasted road transit time indication based on information obtained from a cellular mobile communications network, wherein said information includes information related to mobile terminals connected to the cellular mobile communications network and engaged in calls, and located in the neighborhood of the at least one road.

16. The system of claim 15, wherein said information includes at least one among:

an indication of a number of calls made by mobile terminals connected to the cellular mobile communications network and located in the neighborhood of the at least one road; and an indication of a number of successive positions taken by the mobile terminals connected to the cellular mobile communications network, located in the neighborhood of the at least one road and engaged in calls.

17. The system of claim 16, wherein said correcting comprises:

altering the received forecasted road transit time indication in a first way in case said indication of a number of calls, or said indication of a number of successive positions, exceeds a first predetermined threshold;

altering the received forecasted road transit time indication in a second way, contrary to the first way, in case said indication of a number of calls, or said indication of a number of successive positions, is below a second predetermined threshold lower than the first predetermined threshold;

leaving the received forecasted road transit time indication essentially unaltered in case said indication of a number of calls, or said indication of a number of successive positions, falls amidst said first and second predetermined thresholds.

18. The system of claim 17, wherein said forecasted road transit time indication includes a forecasted average road transit speed, and said altering in the first way comprises decreasing the forecasted average road transit speed, whereas said altering in the second way comprises increasing the forecasted average road transit speed.

19. The system of claim 18, wherein an amount of said decreasing is related to a comparison between said indication of a number of calls, or said indication of a number of successive positions, and the first predetermined threshold.

20. The system of claim 18, wherein an amount of said increasing is related to a comparison between said indication of a number of calls, or said indication of a number of successive positions, and the second predetermined threshold.

21. The system of claim 18, wherein said increasing has an upper limit, and wherein said upper limit is related to a maximum allowed road transit speed on the at least one road.

22. The system of claim 17, wherein said first and second predetermined thresholds are calculated based on historical data derived from the cellular mobile communications network, and wherein said historical data include:

either historical data related to a number of calls made by mobile terminals connected to the cellular mobile communications network and located in the neighborhood of the considered at least one road, or historical data related to a number of successive positions taken by the mobile terminals connected to the cellular mobile communications network, located in the neighborhood of the considered at least one road and engaged in calls, or historical data related to a number of calls made by mobile terminals connected to the cellular mobile communications network and located in the neighborhood of a road of a same road type as the considered at least one road, or historical data related to a number of successive positions taken by the mobile terminals connected to the cellular mobile communications network, located in the neighborhood of a road of the same type as the considered at least one road and engaged in calls, wherein said road type is adapted to discriminate among urban streets, extraurban roads, highways, number of lanes of the road, environment of the road.

23. The system of claim 15, further adapted to:

assigning to said at least one road a transit sense; and in said information related to mobile terminals connected to the cellular mobile communications network and engaged in calls, and located in the neighborhood of the at least one road, considering mobile terminals that are moving congruently to the transit sense assigned to the road.

24. The system of claim 15, wherein said mobile terminals located in the neighborhood of the at least one road include mobile terminals that are located within a predetermined distance from the road.

* * * * *